United States Patent
Choi et al.

(10) Patent No.: US 12,411,653 B2
(45) Date of Patent: Sep. 9, 2025

(54) METHOD AND ELECTRONIC DEVICE FOR DETECTING AMBIENT AUDIO SIGNAL

(71) Applicant: SAMSUNG ELECTRONICS CO., LTD., Suwon-si (KR)

(72) Inventors: Kwangyong Choi, Suwon-si (KR); Daeho Kim, Suwon-si (KR); Sangheon Kim, Suwon-si (KR); Misun Kim, Suwon-si (KR); Mira Seo, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 18/090,299

(22) Filed: Dec. 28, 2022

(65) Prior Publication Data

US 2023/0137857 A1   May 4, 2023

Related U.S. Application Data

(63) Continuation of application No. PCT/KR2021/008424, filed on Jul. 2, 2021.

(30) Foreign Application Priority Data

Jul. 2, 2020   (KR) .................. 10-2020-0081739

(51) Int. Cl.
*G10L 21/02*   (2013.01)
*G06F 3/01*   (2006.01)
*G06F 3/16*   (2006.01)

(52) U.S. Cl.
CPC .............. *G06F 3/167* (2013.01); *G06F 3/011* (2013.01); *G06F 3/162* (2013.01)

(58) Field of Classification Search
CPC .......... G06F 3/167; G06F 3/011; G06F 3/162; G10L 21/02; H04R 1/10; H04R 3/00
(Continued)

(56) References Cited

U.S. PATENT DOCUMENTS

| 5,774,565 A | 6/1998 | Benning et al. |
| 2015/0087257 A1 | 3/2015 | Balram et al. |

(Continued)

FOREIGN PATENT DOCUMENTS

| JP | 2002-182688 | 6/2002 |
| JP | 5084156 | 11/2012 |

(Continued)

OTHER PUBLICATIONS

International Search Report for PCT/KR2021/008424 dated Oct. 12, 2021, 4 pages.

(Continued)

*Primary Examiner* — George C Monikang
(74) *Attorney, Agent, or Firm* — Nixon & Vanderhye, P.C.

(57) ABSTRACT

An example electronic device may include: an audio module; a wireless communication circuit for communicating with at least one external electronic device; a memory; and a processor operatively connected to the wireless communication circuit, the audio module and the memory. The processor may: acquire an ambient audio signal based on at least one of the at least one external electronic device or the audio module; identify whether preset audio information is included, based on the acquired ambient audio signal; determine the at least one external electronic device connected via the wireless communication circuit in response to the identifying of the audio information; and transmit data related to the ambient audio signal to the determined at least one external electronic device.

20 Claims, 15 Drawing Sheets

(58) Field of Classification Search
USPC .................. 381/56, 57, 58, 74, 92, 122
See application file for complete search history.

(56) References Cited

U.S. PATENT DOCUMENTS

| | | |
|---|---|---|
| 2015/0256947 A1 | 9/2015 | Kim et al. |
| 2016/0150338 A1 | 5/2016 | Kim et al. |
| 2016/0174006 A1 | 6/2016 | Lee et al. |
| 2016/0188284 A1 | 6/2016 | Lu et al. |
| 2016/0212522 A1 | 7/2016 | Lee et al. |
| 2016/0324487 A1 | 11/2016 | Guo et al. |
| 2017/0039025 A1 | 2/2017 | Kielak |
| 2019/0052999 A1 | 2/2019 | Lee et al. |
| 2020/0058309 A1 | 2/2020 | Lee et al. |
| 2020/0192627 A1 | 6/2020 | Jang et al. |
| 2021/0345050 A1 | 11/2021 | Song |

FOREIGN PATENT DOCUMENTS

| | | |
|---|---|---|
| JP | 2015-62120 | 4/2015 |
| KR | 94-12997 | 6/1994 |
| KR | 10-2014-0143069 | 12/2014 |
| KR | 10-2015-0103586 | 9/2015 |
| KR | 10-2015-0105130 | 9/2015 |
| KR | 10-2016-0071129 | 6/2016 |
| KR | 10-2017-0016760 | 2/2017 |
| KR | 10-2017-0042799 | 4/2017 |
| KR | 10-2017-0053058 | 5/2017 |
| KR | 10-1750871 | 6/2017 |
| KR | 10-1871660 | 6/2018 |
| KR | 10-2018-0082043 | 7/2018 |
| KR | 10-2019-0016834 | 2/2019 |
| KR | 10-2020-0074445 | 6/2020 |
| KR | 10-2020-0095760 | 8/2020 |
| KR | 10-2151433 | 9/2020 |

OTHER PUBLICATIONS

Written Opinion of the ISA for PCT/KR2021/008424 dated Oct. 12, 2021, 3 pages.
Office Action dated Nov. 28, 2024 in Korean Patent Application No. 10-2020-0081739 and English-language translation.

FIG. 9A

| USER STATE | CONTEXT MATCHING CONDITION | | | EXISTING OPERATION WHEN MATCHING CONTEXT | MICROPHONE PREPARATION OPERATION WHEN MATCHING CONTEXT (ELECTRONIC DEVICE MICROPHONE CONSTANT MONITORING ON/OFF AND SENSITIVITY CONTROL) |
|---|---|---|---|---|---|
| | START | LOCATION | EVENT | | |
| WAY TO WORK | 08:00 - 09:30 | HOME GPS | | FIRST ELECTRONIC DEVICE - LCD OFF, REPRODUCING MUSIC SECOND ELECTRONIC DEVICE (EARPHONE) - OUTPUTTING MUSIC THIRD ELECTRONIC DEVICE - STARTING EXERCISE MODE | FIRST ELECTRONIC DEVICE - MICROPHONE MONITORING OFF SECOND ELECTRONIC DEVICE - MICROPHONE MONITORING ON, SENSITIVITY INCREASE THIRD ELECTRONIC DEVICE - MICROPHONE MONITORING ON, SENSITIVITY INCREASE |
| DURING DRIVING | | | WHEN CONNECTING VEHICLE BLUETOOTH (SECOND ELECTRONIC DEVICE) | FIRST ELECTRONIC DEVICE - VOICE CALLING ON, EXECUTING NAVIGATION SECOND ELECTRONIC DEVICE - START REPRODUCING MUSIC THIRD ELECTRONIC DEVICE - EXECUTING DRIVING MODE | FIRST ELECTRONIC DEVICE - MICROPHONE MONITORING ON, SENSITIVITY INCREASE |
| COMPANY | 09:30 - 18:00 | COMPANY GPS | | FIRST ELECTRONIC DEVICE - VIBRATION MODE, CONNECTING TO COMPANY WI-FI, CONVERTING TO WORKING MODE | FIRST ELECTRONIC DEVICE - MICROPHONE MONITORING ON, SENSITIVITY INCREASE |
| PLAYING GAME | 23:00 | ROOM | | FIRST ELECTRONIC DEVICE - CONVERTING TO LANDSCAPE SCREEN MODE CONNECTING TO HOME WI-FI, BLOCKING NOTIFICATION THIRD ELECTRONIC DEVICE (GLASSES) - REPRODUCING GAME SCREEN | FIRST ELECTRONIC DEVICE - MICROPHONE MONITORING OFF SECOND ELECTRONIC DEVICE - MICROPHONE MONITORING ON, SENSITIVITY INCREASE THIRD ELECTRONIC DEVICE - MICROPHONE MONITORING ON, SENSITIVITY INCREASE |

FIG. 9B

| USER STATE | CONTEXT MATCHING CONDITION ||| EXISTING OPERATION WHEN MATCHING CONTEXT | PREPARE RECOGNITION MODEL WHEN MATCHING CONTEXT |
| --- | --- | --- | --- | --- | --- |
| | START | LOCATION | EVENT | | |
| WAY TO WORK | 09:00- 09:30 | HOME GPS | | FIRST ELECTRONIC DEVICE - LCD OFF, REPRODUCING MUSIC SECOND ELECTRONIC DEVICE (EARPHONE) - OUTPUTTING MUSIC THIRD ELECTRONIC DEVICE - STARTING EXERCISE MODE | DANGER WARNING SOUND MODEL LOADING |
| DURING DRIVING | | | WHEN CONNECTING VEHICLE BLUETOOTH (SECOND ELECTRONIC DEVICE) | FIRST ELECTRONIC DEVICE - VOICE CALLING ON, EXECUTING NAVIGATION SECOND ELECTRONIC DEVICE - START REPRODUCING MUSIC THIRD ELECTRONIC DEVICE - EXECUTING DRIVING MODE | SPEECH DETECTION SOUND MODEL LOADING |
| COMPANY | 09:30 - 18:00 | COMPANY GPS | | FIRST ELECTRONIC DEVICE - VIBRATION MODE, CONNECTING TO COMPANY WI-FI, CONVERTING TO WORKING MODE | VOICE DETECTION SOUND MODEL LOADING |
| PLAYING GAME | 23:00 | ROOM | | FIRST ELECTRONIC DEVICE - CONVERTING TO LANDSCAPE SCREEN MODE, CONNECTING TO HOME WI-FI, BLOCKING NOTIFICATION THIRD ELECTRONIC DEVICE (GLASSES) - REPRODUCING GAME SCREEN | SPEECH DETECTION SOUND MODEL LOADING |

FIG. 11

| USER STATE | CONTEXT MATCHING CONDITION | | | SOUND RECOGNITION MODEL LOADED TO MATCH CONTEXT | SOUND RECOGNIZER OPERATION |
|---|---|---|---|---|---|
| | START | LOCATION | EVENT | | |
| WAY TO WORK | 09:00-09:30 | HOME GPS | | DANGER WARNING SOUND MODEL LOADING | MONITORING DANGER SOUND WITH HIGH PRIORITY AND IGNORE OTHER HUMAN SOUND, ETC. AS NOISE |
| DURING DRIVING | | | WHEN CONNECTING VEHICLE BLUETOOTH (SECOND ELECTRONIC DEVICE) | SPEECH DETECTION SOUND MODEL LOADING | MONITORING HUMAN VOICES WITH HIGH PRIORITY AND IGNORE AMBIENT MUSIC SOUND, ETC. AS NOISE |
| COMPANY | 09:30-18:00 | COMPANY GPS | | VOICE DETECTION SOUND MODEL LOADING | MONITOR HUMAN VOICES WITH HIGH PRIORITY AND IGNORE AMBIENT MUSIC SOUND, ETC. AS NOISE |
| PLAYING GAME | 23:00 | ROOM | | SPEECH DETECTION SOUND MODEL LOADING | MONITOR HUMAN VOICES WITH HIGH PRIORITY AND IGNORE AMBIENT MUSIC SOUND, ETC. AS NOISE |

FIG. 13

| USER STATE | CONTEXT MATCHING CONDITION | | | TRANSMISSION DATA TYPE | SOUND RECOGNIZER OPERATION |
|---|---|---|---|---|---|
| | START | LOCATION | EVENT | | |
| WAY TO WORK | 08:00-08:30 | HOME GPS | | ORIGINAL SOUND, MODE CHANGE COMMAND | ALL OUTPUTTING DEVICES CAPABLE OF COMMUNICATION WITH FIRST ELECTRONIC DEVICE |
| DURING DRIVING | | | WHEN CONNECTING VEHICLE BLUETOOTH (SECOND ELECTRONIC DEVICE) | ORIGINAL SOUND | FIRST ELECTRONIC DEVICE OPERATING NAVIGATION |
| COMPANY | 09:30-18:00 | COMPANY GPS | | ORIGINAL SOUND | OUTPUTTING DEVICE DIRECTLY CONNECTED TO FIRST ELECTRONIC DEVICE |
| PLAYING GAME | 23:00 | ROOM | | ORIGINAL SOUND | ANOTHER SECOND ELECTRONIC DEVICE SPECIFIED IN SPEECH |

METHOD AND ELECTRONIC DEVICE FOR DETECTING AMBIENT AUDIO SIGNAL

CROSS-REFERENCE TO RELATED APPLICATIONS

This application is a continuation of International Application No. PCT/KR2021/008424 designating the United States, filed on Jul. 2, 2021, in the Korean Intellectual Property Receiving Office and claiming priority to Korean Patent Application 10-2020-0081739, filed on Jul. 2, 2020, in the Korean Intellectual Property Office, the disclosures of each of which are incorporated by reference herein in their entireties.

BACKGROUND

Field

The disclosure relates to a method and an electronic device for detecting an ambient audio signal.

Description of Related Art

With the advancement of techniques, electronic devices may be used in various ways. An electronic device has been developed to detect an audio signal and determine an ambient situation of a user based on the detected audio signal. The electronic device may analyze the detected audio signal based on a context-aware technology.

The electronic device may perform wireless communication with another external electronic device (e.g., an ear wearable device and an earphone), and at least partially control the other electronic device. For example, the electronic device may change an operation mode of the other electronic device and acquire an audio signal using a microphone provided in the other electronic device. The electronic device may analyze the audio signal acquired through the other external electronic device to identify an ambient situation of a user.

SUMMARY

The electronic device may perform wireless communication with another external electronic device (e.g., an earphone) and at least partially control the ear wearable device. For example, the electronic device may reproduce music in a state in which the ear wearable device is worn on the ear of a user. In a case in which the user wears the ear wearable device on his or her ear, the eardrum is blocked and thus it may be difficult for the user to detect an ambient audio signal. In this case, the probability that the user is exposed to the risk of an accident may increase.

Embodiments of the disclosure may provide a method for detecting an ambient audio signal even in aa case in which the user is reproducing music while wearing the ear wearable device on the ear, and an electronic device for implementing same.

An electronic device according to various example embodiments may include an audio module, a wireless communication circuit for communicating with at least one external electronic device, a memory, and a processor operatively connected to the wireless communication circuit, the audio module, and the memory. The processor may acquire an ambient audio signal based on the at least one external electronic device and the audio module, identify whether preconfigured audio information is included based on the acquired ambient audio signal, determine the at least one external electronic device connected via the wireless communication circuit in response to identifying the audio information, and transmit data related to the ambient audio signal to the determined at least one external electronic device.

The method according to various embodiments may include acquiring an ambient audio signal based on at least one of an electronic device or at least one external electronic device connected to the electronic device to perform communication therewith, identifying whether preconfigured audio information is included based on the acquired ambient audio signal, determining the at least one external electronic device in response to the identifying the audio information, and transmitting data related to the ambient audio signal to the determined at least one external electronic device.

Various embodiments of the disclosure can, for example, detect an ambient audio signal and prevent an accident while reproducing music using an ear wearable device connected to an electronic device.

According to various example embodiments, the electronic device may determine at least one microphone to receive an ambient audio signal in consideration of context information. According to an embodiment, the electronic device may analyze the received ambient audio signal and determine at least one reception device (e.g., a receiver) to which to transmit the ambient audio signal. According to an embodiment, the electronic device may at least partially control an external electronic device (e.g., an external electronic device provided with a microphone and/or a receiver) operatively connected thereto.

According to various example embodiments, the electronic device may detect a situation corresponding to an ambient audio signal while music is reproduced using an ear wearable device, and provide notification information corresponding to the detected situation to another external electronic device. In addition, various effects directly or indirectly identified through the disclosure may be provided.

BRIEF DESCRIPTION OF THE DRAWINGS

In connection with the description of the drawings, like or similar reference numerals may be used for like or similar elements.

The above and other aspects, features and advantages of certain embodiments of the present disclosure will be more apparent from the following detailed description, taken in conjunction with the accompanying drawings, in which:

FIG. 9A is a table illustrating an embodiment in which microphone configuration of an electronic device and at least one external electronic device is changed based on collected context information, according to various embodiments;

FIG. 9B is a table illustrating an embodiment in which an operation mode of an electronic device and at least one external electronic device is changed based on collected context information, according to various embodiments;

FIG. 11 is a table illustrating an embodiment in which, based on a received ambient audio signal, an example electronic device ignores the ambient audio signal, according to various embodiments;

FIG. 13 is a table illustrating an embodiment in which an example electronic device determines at least one external electronic device to which to transmit an analysis-completed ambient audio signal, according to various embodiments.

DETAILED DESCRIPTION

Figure 1:
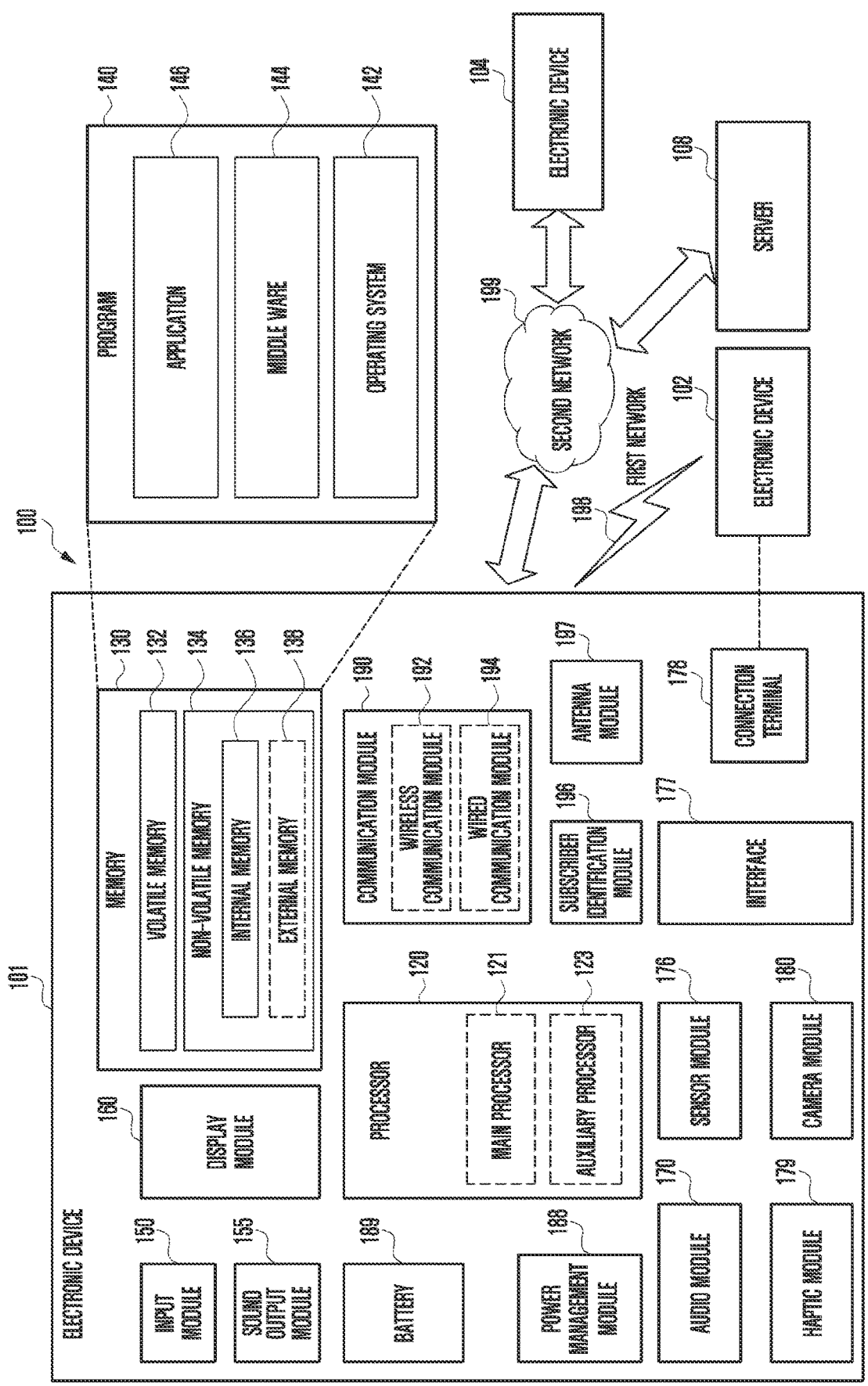
FIG. 1 is a block diagram illustrating an example electronic device in a network environment according to various embodiments.

FIG. 1 illustrates an example electronic device in a network environment according to various embodiments. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connection terminal 178, a haptic module 179, a camera module 180, a power management module 188, a battery 189, a communication module 190, a subscriber identity module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
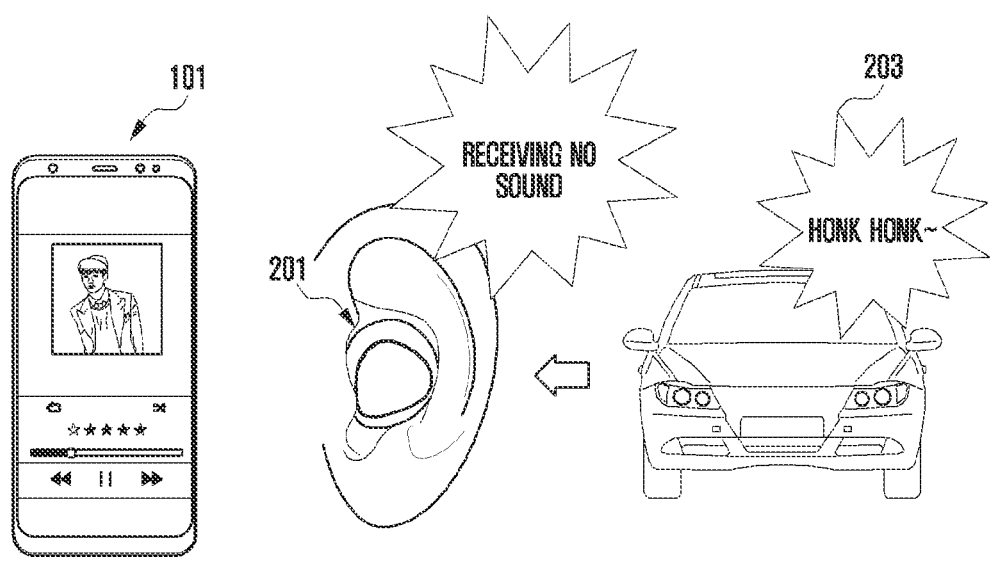
FIG. 2 is an illustrates a situation in which an ambient audio signal may not be heard in a case in which an ear wearable device is worn according to various embodiments.

FIG. 2 illustrates a situation in which an ambient audio signal may not be heard in a case in which an ear wearable device is worn, according to various embodiments.

Referring to FIG. 2, in various embodiments, the electronic device 101 (e.g., the electronic device 101 in FIG. 1) may be operatively connected to the ear wearable device 201 (e.g., the electronic device 102, 104, in FIG. 1 or an earphone). The ear wearable device 201 may be worn in close contact with at least a part of the ear of a user and the eardrum may be in a blocked state that does not allow external sound to enter. The electronic device 101 may execute a music-related application and output music through the ear wearable device 201. According to an embodiment, in a case in which music is reproduced in a state in which the ear wearable device 201 is worn on the ear, it may be difficult for the user to hear external sounds. For example, the external sounds may include a warning sound to notify the surrounding danger, such as a car horn 203.

According to an embodiment, in a case in which the user listens to music using the ear wearable device 201, the ear of the user may be blocked by the ear wearable device 201. According to an embodiment, while music is reproduced, it may be difficult for the user to detect an audio signal from the surroundings. For example, the user may not recognize a car horn 203 indicating a potentially dangerous situation.

Figure 3:
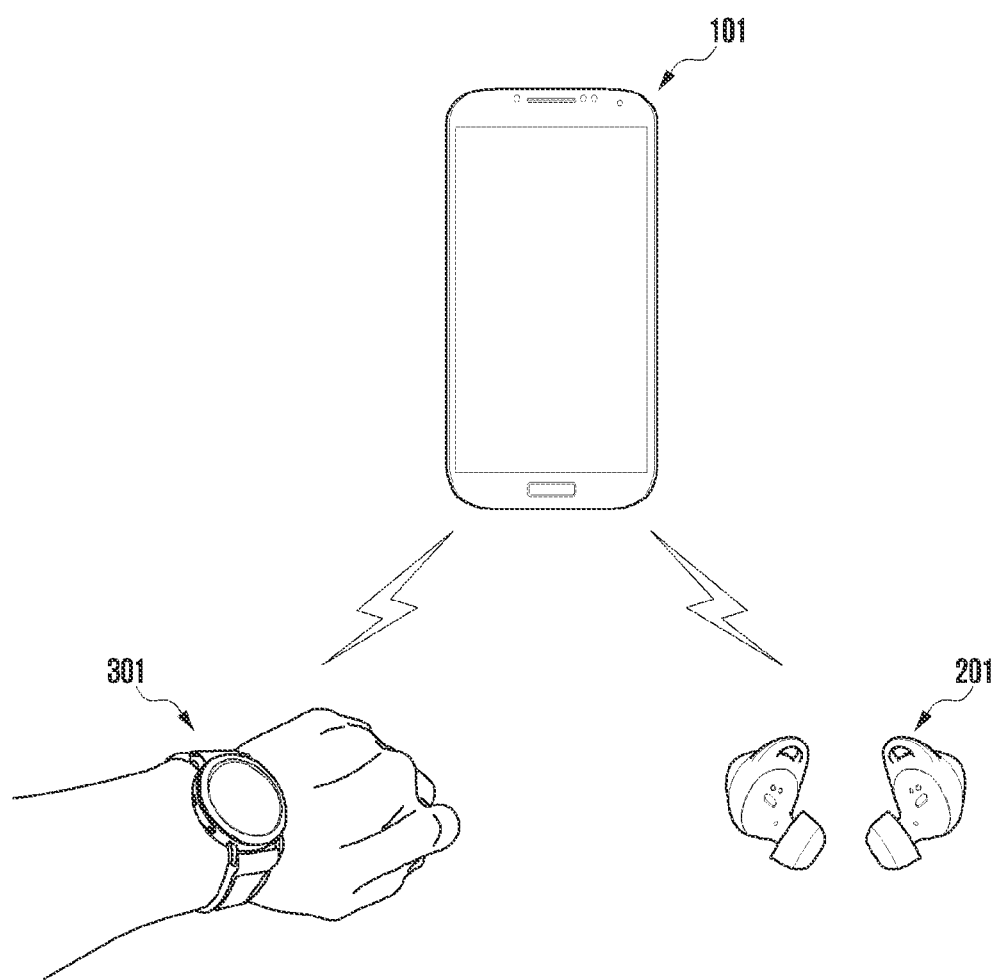
FIG. 3 illustrates a situation in which an example electronic device is operatively connected to at least one external electronic device and the at least one external electronic device is at least partially controlled by the example electronic device, according to various embodiments.

FIG. 3 illustrates a situation in which an example electronic device is operatively connected to at least one external electronic device and the at least one external electronic device is at least partially controlled by the electronic device, according to various embodiments.

Referring to FIG. 3, in various embodiments, the electronic device 101 (e.g., the electronic device 101 in FIG. 1) may be operatively connected to the ear wearable device 201 (e.g., the electronic device 102, 104, in FIG. 1 or an earphone) and/or a wrist wearable device 301 (e.g., the electronic device 102, 104 in FIG. 1). According to an embodiment, the electronic device 101 may at least partially control the ear wearable device 201 and the wrist wearable device 301. For example, the electronic device 101 may convert a mode of use of the ear wearable device 201 and the wrist wearable device 301 and at least partially control some components (e.g., a microphone, a speaker, and a sensor module). According to an embodiment, the electronic device 101 may control to activate a microphone provided in the ear wearable device 201 so as to receive an ambient audio signal. The electronic device 101 may convert an operation mode of the ear wearable device 201 to receive an audio signal through the ear wearable device 201.

According to various embodiments, the electronic device 101 may select at least one external electronic device (e.g., the ear wearable device 201 and/or the wrist wearable device 301) including a microphone and at least partially control the external electronic device to receive an ambient audio signal through the selected external electronic device. The electronic device 101 may analyze the received ambient audio signal and determine at least one external electronic device to which to transmit data related to a selected audio signal based on the analysis result.

According to various embodiments, the electronic device 101 and/or the at least one external electronic device may acquire context information. In consideration of the context information, the electronic device 101 may determine at least one external electronic device to receive an ambient audio signal. The at least one external electronic device may include at least one microphone. According to an embodiment, the context information may include information indicating a state of the electronic device 101, which is detected using a sensor module (e.g., the sensor module 176 in FIG. 1) (e.g., including a sensor). For example, the context information of the electronic device 101 may include information for determining whether the electronic device 101 is positioned inside a pocket using an illuminance sensor. For example, the context information of the external electronic device may include information for determining a relative position with reference to the electronic device 101, using a gyro sensor and/or an acceleration sensor. According to an embodiment, the context information may include information related to a situation in which a user is using the electronic device 101 using at least one sensor.

Figure 4:
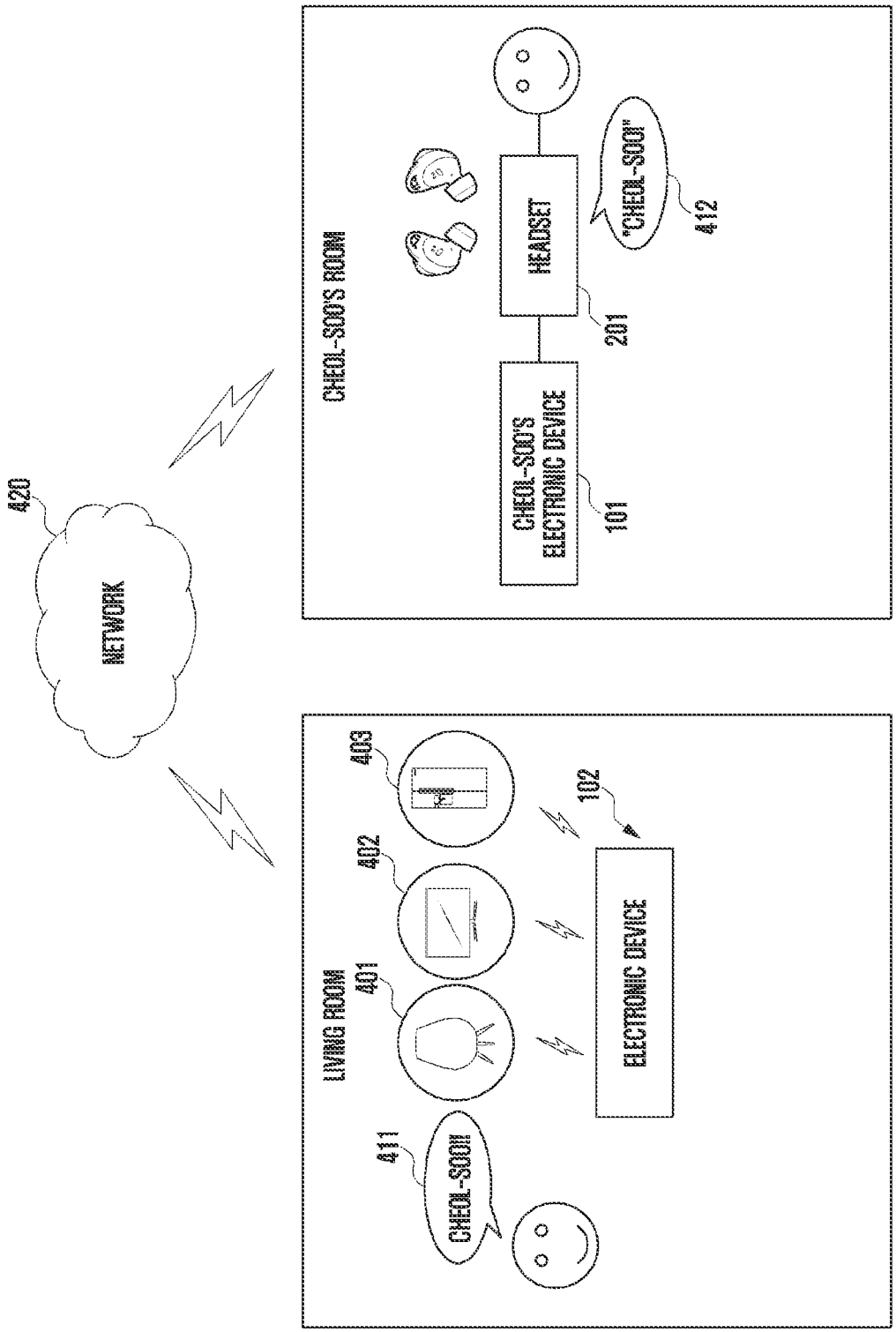
FIG. 4 illustrates a situation in which an example electronic device provided with a microphone is selected to receive an ambient audio signal and another electronic device is determined to transfer the received ambient audio signal, according to various embodiments.

FIG. 4 illustrates a situation in which an example electronic device provided with a microphone is selected to receive an ambient audio signal and another electronic device is determined to which to transfer the received ambient audio signal according to various embodiments of the disclosure.

Referring to FIG. 4, in various embodiments, the electronic device 101 (e.g., the electronic device 101 in FIG. 1) may perform communication with at least one external electronic device 102 (e.g., the electronic device 102 in FIG. 1) through a network 420 (e.g., the first network 198 and/or the second network 199 in FIG. 1). The electronic device 101 may be operatively connected to the ear wearable device 201 (e.g., a headset and/or an earphone) and at least partially control the ear wearable device 201. According to an embodiment, the at least one external electronic device 102 may be operatively connected to other multiple electronic devices (e.g., an AI speaker 401, a television set 402, and a refrigerator 403). According to an embodiment, the electronic device 101 may at least partially control the at least one external electronic device 102 and/or the multiple other electronic devices operatively connected to the at least one external electronic device 102. For example, the electronic device 101 may activate a microphone device provided in the at least one external electronic device 102 and acquire an ambient audio signal through the activated microphone device. The electronic device 101 may receive the ambient audio signal from the at least one external electronic device 102 and analyze the ambient audio signal. According to an embodiment, the at least one external electronic device 102 may analyze an ambient audio signal by itself and transfer analyzed result data to the electronic device 101.

According to an embodiment, the electronic device 101 may be positioned in a user's (e.g., Cheol-soo's) room and the at least one external electronic device 102 connected to the electronic device 101 may be positioned in a living room. For example, the user may wear the ear wearable device 201 connected to the electronic device 101 and may be in a state of listening to music. In a case in which that user's mother calls the user by name (e.g., Cheol-soo) in the living room, the at least one external electronic device 102 positioned in the living room may acquire an audio signal of the mother and transmit the acquired audio signal of the mother to the electronic device 101. The electronic device 101 may analyze the audio signal of mother transferred from the at least one external electronic device 102 and determine to transmit the audio signal to the ear wearable device 201 based on the analyzed audio signal. The electronic device 101 may transmit the analyzed audio signal to the ear wearable device 201 and output the audio signal through the ear wearable device 201. According to an embodiment, the electronic device 101 may select the at least one external electronic device 102 to receive an ambient audio signal and select the ear wearable device 201 for outputting the audio signal.

Figure 5:
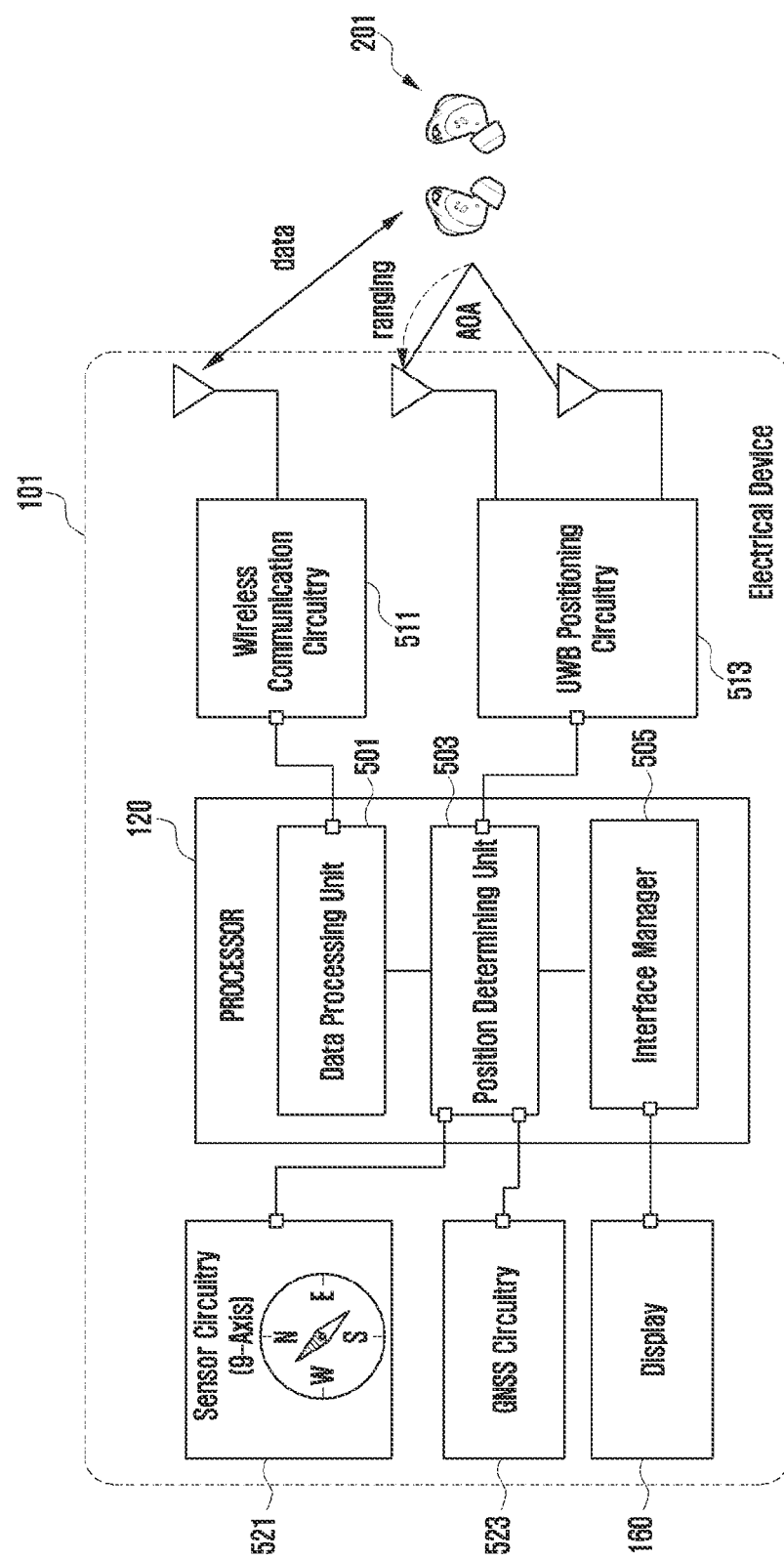
FIG. 5 illustrates a procedure in which an example electronic device determines at least one external electronic device to receive an ambient audio signal, according to various embodiments.

FIG. 5 illustrates a procedure in which an example electronic device determines at least one external electronic device to receive an ambient audio signal, according to various embodiments.

Referring to FIG. 5, the electronic device 101 (e.g., the electronic device 101 in FIG. 1) may be operatively connected to an external electronic device (e.g., the ear wearable device 201 in FIG. 2) and at least partially control the ear wearable device 201. The electronic device 101 may perform communication with the ear wearable device 201 through a network (e.g., the first network 198 and/or the second network 199 in FIG. 1). According to an embodiment, the electronic device 101 may include a processor 120 (e.g., the processor 120 in FIG. 1) (e.g, including processing circuitry), a wireless communication circuit (circuitry) 511, an ultra-wideband (UWB) positioning circuit (circuitry) 513, a sensor circuit (circuitry) 521, and/or a global navigation satellite system (GNSS) circuit (circuitry) 523. The processor 120 may include a data processing unit 501 (e.g., including data processing circuitry), a position determining unit 503 (e.g., including position determining circuitry), and/or an interface manager 505. According to an embodiment, the electronic device 101 may be operatively connected to the ear wearable device 201 and determine a relative position of the ear wearable device 201 with reference to the electronic device 101. According to an embodiment, the electronic device 101 may determine whether an ambient audio signal may be received from the ear wearable device 201 based on the position of the ear wearable device 201. In a case in which it has been determined that an ambient audio signal may be received from the ear wearable device 201, the electronic device 101 may partially control the ear wearable device 201 to receive an ambient audio signal through the ear wearable device 201.

The data processing unit 501 of the processor 120 may process data transmitted to/received from the ear wearable device 201 operatively connected to the electronic device 101. For example, the data processing unit 501 may encode data to be converted into a digital signal and transmit the digital signal to the ear wearable device 201. The data processing unit 501 may decode a digital signal received from the ear wearable device 201 to be converted into data. According to an embodiment, the data processing unit 501 may process command data for at least partially controlling the ear wearable device 201. According to an embodiment, the data processing unit 501 may transmit/receive a signal to/from the ear wearable device 201 through the wireless communication circuit 511.

The position determining unit 503 of the processor 120 may identify a relative position of the ear wearable device 201 operatively connected to the electronic device 101.

According to an embodiment, the position determining unit 503 may determine a relative position of the ear wearable device 201 with reference to the electronic device 101 using the sensor circuit 521 and/or the GNSS circuit 523 of the electronic device 101. For example, the position determining unit 503 may determine whether the ear wearable device 201 is positioned in the right direction or in the left direction of the electronic device 101. The position determining unit 503 may determine whether the height of the ear wearable device 201 is higher or lower with reference to the electronic device 101. According to an embodiment, the position determining unit 503 may identify a relative position of the ear wearable device 201 using the UWB positioning circuit 513. The position determining unit 503 may measure range information and/or angle information (arrival of angle (AOA) information) of the ear wearable device 201 using a UWB signal (e.g., a sequential ranging block). For example, the position determining unit 503 may measure transmission/reception time of a poll message and/or response message with respect to the ear wearable device 201 and determine range information of the ear wearable device 201 based on the measured transmission/reception time. According to an embodiment, the UWB signal may include a directional signal and direction information, range information, and/or angle information of the external electronic device (e.g., the ear wearable device 201) operatively connected to the electronic device 101 may be identified. According to an embodiment, the processor 120 may at least partially control the ear wearable device 201 using the UWB signal.

According to an embodiment, the processor 120 of the electronic device 101 may acquire direction information, range information, and/or angle information corresponding to the ear wearable device 201 (e.g., the external electronic device) and determine a relative position (e.g., a position and a posture) of the ear wearable device 201 based on at least one of the direction information, the range information, and/or the angle information. According to an embodiment, the processor 120 may acquire satellite positioning information using the GNSS circuit 523 and may have improved accuracy in determining a position of the ear wearable device 201. According to an embodiment, the processor 120 may determine whether the ear wearable device may receive an ambient audio signal based on a relative position of the ear wearable device 201. According to an embodiment, the processor 120 may receive an ambient audio signal through the ear wearable device 201. According to an embodiment, the processor 120 may determine whether data related to an audio signal is transmitted, based on a relative position of the ear wearable device 201. According to an embodiment, the processor 120 may transmit data related to the audio signal to the ear wearable device 201.

The interface manager 505 of the processor 120 may display a user interface through a display 160 (e.g., the display module 160 in FIG. 1). According to an embodiment, the interface manager 505 may configure a user interface for selecting at least one external electronic device for receiving an ambient audio signal and display the user interface through the display 160. According to an embodiment, the interface manager 505 may configure a user interface to select at least one external electronic device to which to transmit data information related to an audio signal after analysis of the audio signal is completed, and display the user interface through the display 160. According to an embodiment, the interface manager 505 may provide, to a user, a user interface for selecting at least one external electronic device. The interface manager 505 may make a list of at least one external electronic device operatively connected to the electronic device 101 and provide the list to a user.

Referring to FIG. 5, although a situation in which the electronic device 101 and the ear wearable device 201 are operatively connected is illustrated, the disclosure is not limited to the ear wearable device 201. The electronic device 101 may be operatively connected to at least one external electronic device capable of communication and may at least partially control the at least one external electronic device.

According to various embodiments, the electronic device 101 may include an audio module 170 (e.g, including audio circuitry), a wireless communication circuit 190 for communicating with at least one external electronic device 102, a memory 130, and a processor 120 operatively connected to the audio module 170, the wireless communication circuit 190, and the memory 130. The processor 120 may acquire an ambient audio signal based on at least one of the at least one external electronic device 102 or the audio module 170, identify whether preconfigured audio information is included, based on the acquired ambient audio signal, determine the at least one external electronic device connected via the wireless communication circuit 190 in response to the identifying the audio information, and transmit data related to the ambient audio signal to the determined at least one external electronic device.

According to an embodiment, the electronic device 101 may further include a sensor module 176, and the processor 120 may acquire context information of the electronic device through at least one of the at least one external electronic device or the sensor module 176, determine at least one microphone device to acquire an ambient audio signal based on the acquired context information, and acquire the ambient audio signal through the determined at least one microphone device.

According to an embodiment, the context information may include at least one of information related a state of the electronic device, user activity information, user schedule information, time information, location information, or event information.

According to an embodiment, the processor 120 may change configuration information of the at least one microphone device to allow the at least one microphone device to acquire the ambient audio signal.

According to an embodiment, the processor 120 may increase sensitivity of the microphone device based on the acquired context information in a case in which the ambient audio signal needs to be accurately acquired (e.g., acquired with an accuracy greater than a first defined accuracy), and may decrease sensitivity of the microphone device based on the acquired context information in a case in which the ambient audio signal does not need to be accurately acquired (e.g., acquired with an accuracy less than a second defined accuracy).

According to an embodiment, the processor 120 may acquire at least one of range information or angle information of the at least one external electronic device using an ultra-wideband (UWB) signal and determine the at least one external electronic device based on at least one of the acquired range information or angle information.

According to an embodiment, the at least one external electronic device may include an ear wearable device that may be mounted on the user's ear and/or a wearable device that may be worn at least partially on a user's body.

According to an embodiment, the preconfigured audio information may include at least one of a vehicle horn sound, navigation voice information, AI speaker voice information, a siren sound, a police car signal sound, an ambulance signal sound, or a fire engine signal sound.

According to an embodiment, the processor 120 may identify an emergency situation, based on the audio information included in the ambient audio signal and transmit the data related to the ambient audio signal to all external electronic devices connected to the electronic device based on an emergency situation being identified.

According to an embodiment, the processor 120 may determine at least one external electronic device corresponding to the audio information based on no emergency situation being identified and transmit data related to the ambient audio signal to the determined at least one external electronic device.

According to an embodiment, the data related to the ambient audio signal may include at least one of an original sound of the ambient audio signal, a notification sound corresponding to the ambient audio signal, a preconfigured notification message, or preconfigured notification information.

Figure 6:
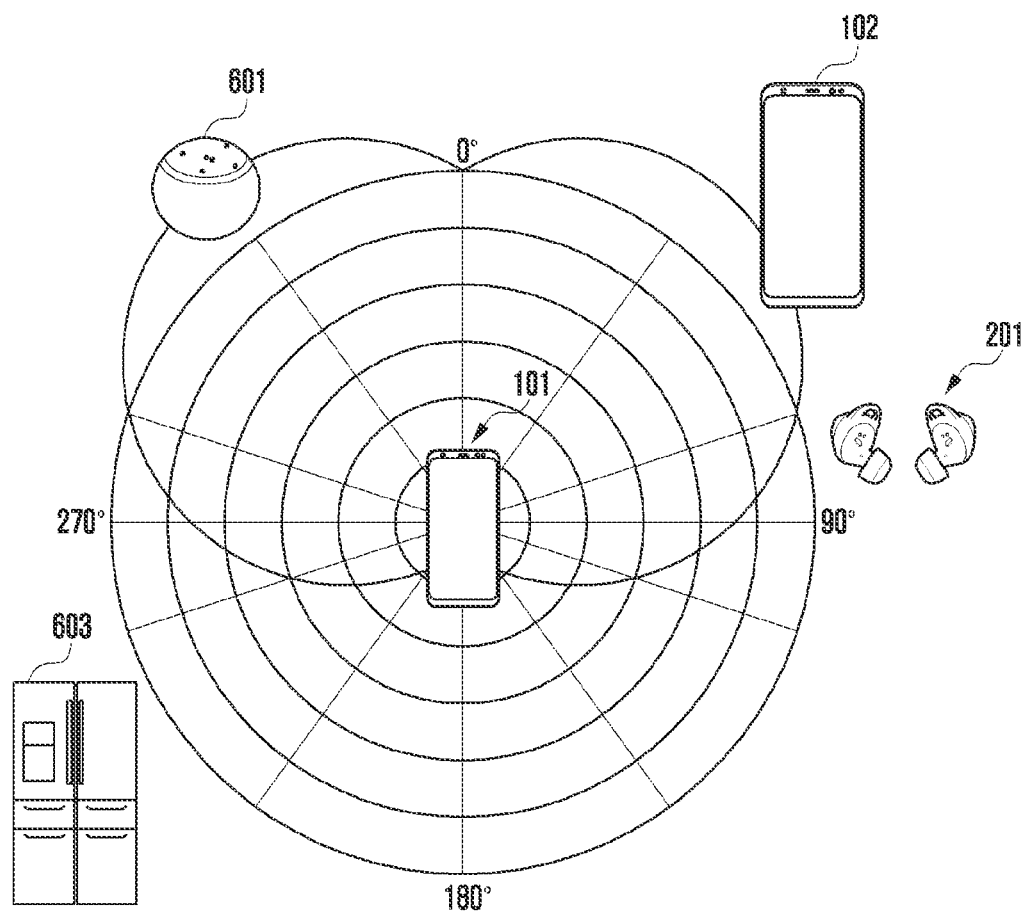
FIG. 6 illustrates a procedure in which an example electronic device determines at least one external electronic device to which to transmit an analysis-completed ambient audio signal, according to various embodiments.

FIG. 6 illustrates a procedure in which an example electronic device determines at least one external electronic device to which to transmit an analysis-completed ambient audio signal, according to various embodiments.

Referring to FIG. 6, the electronic device 101 (e.g., the electronic device 101 in FIG. 1) may be operatively connected to at least one external electronic device (e.g., the electronic device 102 in FIG. 1, the ear wearable device 201, the AI speaker 601, and/or the refrigerator 603 in FIG. 2). According to an embodiment, the electronic device 101 may transmit/receive data to/from at least one external electronic device positioned within a range where network communication is possible. The electronic device 101 may at least partially control at least one external electronic device. For example, the electronic device 101 may change an operation mode of the ear wearable device 201 or turn on/off power of the AI speaker 601.

According to an embodiment, the electronic device 101 may transmit a UWB signal to at least one external electronic device using a UWB positioning circuit (e.g., the UWB positioning circuit 513 in FIG. 5). The UWB signal is a directional signal and direction information, range information, and/or angle information of at least one external electronic device operatively connected to the electronic device 101 may be identified. For example, the electronic device 101 may receive a response signal of the UWB signal from the at least one external electronic device and identify a relative position of the at least one external electronic device based on the response signal. According to an embodiment, the electronic device 101 may determine at least one external electronic device to receive an ambient audio signal using the UWB signal. According to an embodiment, the electronic device 101 may determine at least one external electronic device to which to transmit data related to an analysis-completed audio signal using the UWB signal.

Figure 7:
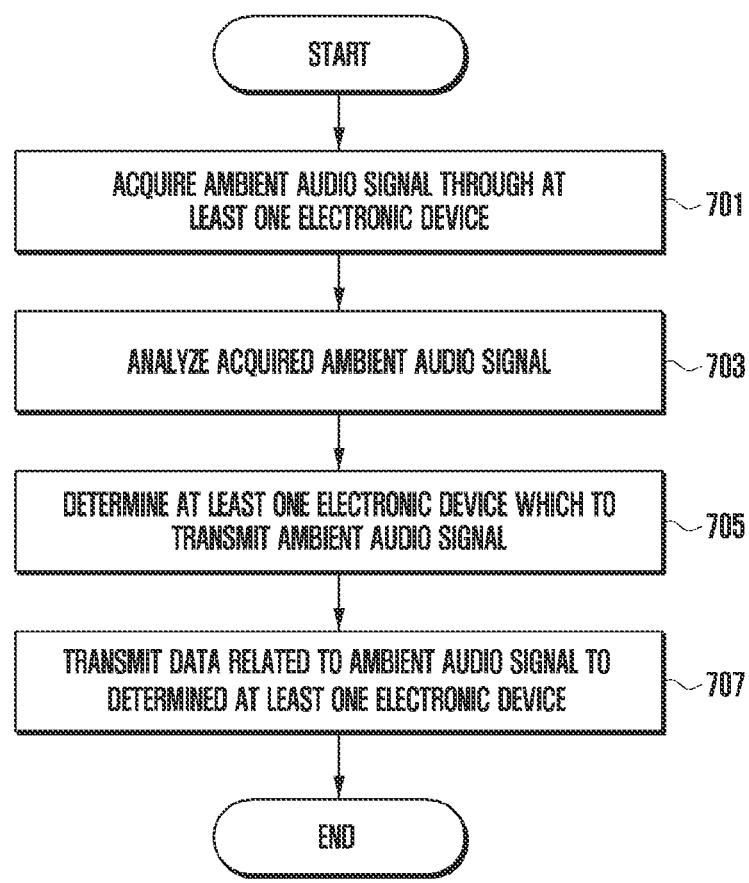
FIG. 7 is a flowchart illustrating an example method for determining at least one external electronic device to receive an ambient audio signal, analyzing the ambient audio signal, and transmitting data related to the ambient audio signal, according to various embodiments.

FIG. 7 is a flowchart illustrating an example method for determining at least one external electronic device for selecting at least one external electronic device to receive an ambient audio signal, analyzing the ambient audio signal, and transmitting data related to the ambient audio signal, according to various embodiments.

In operation 701, a processor (e.g., the processor 120 in FIG. 1) of the electronic device (e.g., the electronic device 101 in FIG. 1) may be operatively connected to at least one external electronic device (e.g., the electronic device 102 in FIG. 1 and the ear wearable device 201 in FIG. 2) and acquire an ambient audio signal through the at least one external electronic device. According to an embodiment, the electronic device 101 may at least partially control the at least one external electronic device. For example, the electronic device 101 may control a microphone included in the at least one external electronic device and acquire an ambient audio signal through the microphone. According to an embodiment, the electronic device 101 may change an operation mode of the at least one external electronic device. For example, the at least one external electronic device may be changed to be in a mode with increased microphone sensitivity in order to receive an ambient audio signal more accurately. According to an embodiment, the at least one external electronic device may include an ear wearable device 201. The electronic device 101 (e.g., a smartphone of a user) may acquire an ambient audio signal using the microphone provided in the ear wearable device 201 in a state of reproducing music through the ear wearable device 201.

In operation 703, the electronic device 101 may analyze the ambient audio signal acquired through the at least one external electronic device. According to an embodiment, at least one external electronic device may acquire an ambient audio signal through a microphone and transmit the acquired ambient audio signal to the electronic device 101. The electronic device 101 may identify whether preconfigured audio information is included, based on the ambient audio signal. For example, the preconfigured audio information may include at least one of a vehicle horn sound, navigation voice information, AI speaker voice information, a siren sound, a police car signal sound, an ambulance signal sound, or a fire engine signal sound. According to an embodiment, the preconfigured audio information may, for example, include a warning sound indicating an emergency situation. According to an embodiment, the preconfigured audio information may be configured by a user and may include a keyword indicating a specific target. According to an embodiment, the electronic device 101 may analyze whether preconfigured audio information is included in the ambient audio signal. According to an embodiment, the electronic device 101 may determine that the ambient audio signal is a noise signal in a case in which the preconfigured audio information is not included in the ambient audio signal and ignore acquisition of the noise signal.

In operation 705, the electronic device 101 may determine at least one external electronic device to which the analysis-completed audio signal is transmitted. For example, in a case in which a user is listening to music while wearing the ear wearable device 201 on the ear, the electronic device 101 may determine the ear wearable device 201 as a target to which the ambient audio signal is transmitted. According to an embodiment, the electronic device 101 may determine a wrist wearable device worn on the wrist as a target to which the ambient audio signal is transmitted.

In operation 707, the electronic device 101 may transmit data related to the ambient audio signal to the determined at least one external electronic device. For example, the data related to the ambient audio signal may include at least one of an original sound of the ambient audio signal, a notification sound corresponding to the ambient audio signal, a preconfigured notification message, or preconfigured notification information.

Figure 8:
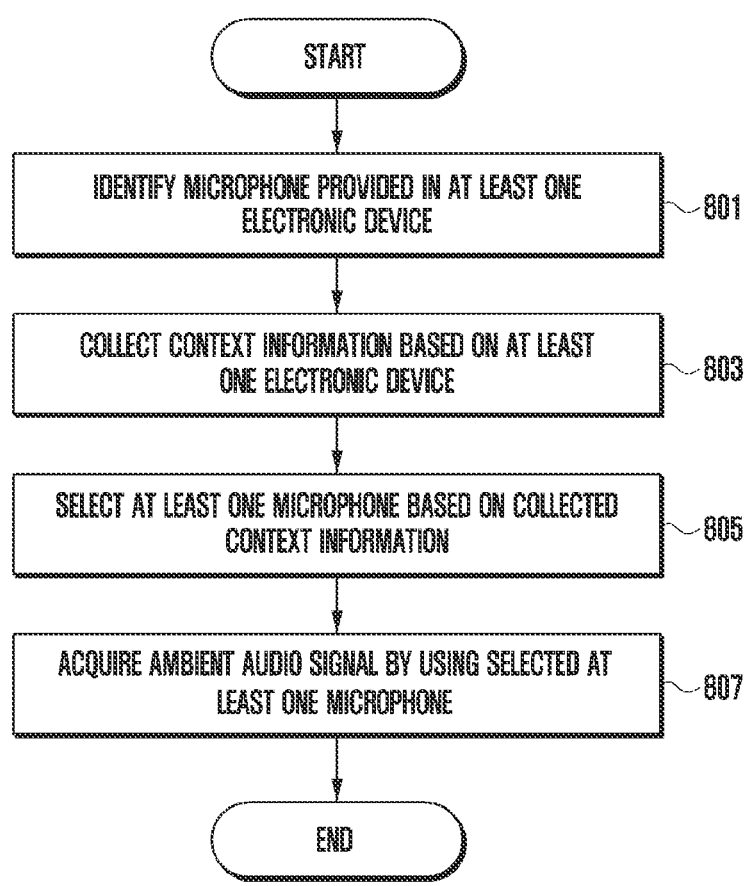
FIG. 8 is a flowchart illustrating an example method for selecting at least one external electronic device to collect context information and receive an ambient audio signal based on the context information, according to various embodiments.

FIG. 8 is a flowchart illustrating an example method for selecting at least one external electronic device to collect context information and receive an ambient audio signal based on the context information, according to various embodiments.

According to an embodiment, an electronic device (e.g., the electronic device 101 in FIG. 1) may collect context information including at least one of user's state information (e.g., activity information and schedule information), time information, location information, and/or event information. According to an embodiment, a processor (e.g., the processor 120 in FIG. 1) of the electronic device 101 may determine at least one external electronic device for receiving an ambient audio signal based on the collected context information. According to an embodiment, the electronic device 101 may continuously collect context information at configured time intervals and determine at least one external electronic device based on the collected context information. According to an embodiment, the processor 120 may determine at least one external electronic device to which the analysis-completed ambient audio signal is transmitted, based on the collected context information.

In operation 801, the electronic device 101 may be operatively connected to at least one external electronic device and identify a microphone provided in the at least one external electronic device. For example, the external electronic device including a microphone may be referred to as a microphone device. According to an embodiment, the electronic device 101 may identify a position of the microphone provided in the at least one external electronic device. For example, in a case of an external electronic device including multiple microphones, the electronic device 101 may identify arrangement position of each microphone individually.

In operation 803, the electronic device 101 may collect context information using at least one of the electronic device 101 or the at least one external electronic device. For example, the context information may include at least one of user's state information (e.g., activity information and schedule information), time information, location information, and/or event information. According to an embodiment, the electronic device 101 and the external electronic device may collect context information using at least one provided sensor and may continuously collect context information in real time or at preconfigured time intervals. According to an embodiment, the electronic device 101 may store the collected context information in a memory (e.g., the memory 130 in FIG. 1).

In operation 805, the electronic device 101 may select at least one microphone based on the collected context information. The selecting of a microphone may refer, for example, to selecting at least one external electronic device provided with a microphone. According to an embodiment, the electronic device 101 may select a microphone provided in at least one external electronic device, based on the context information. According to an embodiment, the electronic device 101 may identify whether it is a situation requiring accurate acquisition of an ambient audio signal, based on the collected context information. For example, the electronic device 101 may determine that it is a situation requiring accurate acquisition of an ambient audio signal (e.g., accuracy greater than some defined accuracy value) and increase sensitivity of the microphone. For example, the electronic device 101 may determine that it is a situation not requiring accurate acquisition of an ambient audio signal (e.g., accuracy less than some defined accuracy value) and decrease sensitivity of the microphone. According to an embodiment, the electronic device 101 may determine whether to acquire the ambient audio signal more accurately, based on the context information, and increase sensitivity of the microphone in a case in which accurate acquisition of an ambient audio signal is required or desirable.

In operation 807, the electronic device 101 may acquire an ambient audio signal using at least one microphone of the at least one external electronic device. For example, the electronic device 101 may acquire an ambient audio signal using a microphone included in the ear wearable device 201 in a state of reproducing music through the ear wearable device 201.

FIG. 9A is a table illustrating an example embodiment in which microphone configuration of an electronic device and at least one external electronic device is changed based on collected context information, according to various embodiments.

Referring to FIG. 9A, the electronic device 101 (e.g., the electronic device 101 in FIG. 1) may be operatively connected to at least one external electronic device (e.g., the electronic device 201 in FIG. 2 and the wrist wearable device 301 in FIG. 3). The electronic device 101 may collect context information through at least one of the electronic device 101 or at least one external electronic device. According to an embodiment, the context information may include user's state information (e.g., user's movement information, user's activity information, and/or user's location information), time information, location information, and/or event information. According to an embodiment, the context information may be added or deleted depending on user's needs. According to an embodiment, the electronic device 101 may change microphone configuration of the electronic device 101 or at least one external electronic device, based on the collected context information.

According to an embodiment, the electronic device 101 (e.g., a first electronic device) may identify whether a preconfigured condition is satisfied based on the collected context information and in a case in which the configured condition is satisfied, at least partially control an operation of the electronic device 101 and at least one external electronic device (e.g., a second electronic device and a third electronic device).

For example, according to a first embodiment, the first electronic device (e.g., the electronic device 101) may identify whether a user is positioned at home at a time to go to work (e.g., 9 a.m.) and in a case in which the condition is satisfied, turn off a display (e.g., the display module 160 in FIG. 1) of the first electronic device and reproduce configured music. The first electronic device may control the second electronic device (e.g., the ear wearable device 201 in FIG. 2) operatively connected thereto to output music through the second electronic device. The first electronic device may control the third electronic device (e.g., the wrist wearable device 301 in FIG. 3) operatively connected thereto to change the third electronic device into an exercise mode. According to an embodiment, the first electronic device may turn off a microphone and may not receive an ambient audio signal. The first electronic device may change configuration information of the second electronic device to increase microphone sensitivity of the second electronic device and control to receive an ambient audio signal. The first electronic device may change configuration information of the third electronic device to increase microphone sensitivity of the third electronic device and control to receive an ambient audio signal. According to an embodiment, the electronic device 101 may determine at least one external electronic device capable of receiving an ambient audio signal. According to an embodiment, the electronic device 101 may at least partially control the electronic device 101 and at least one external electronic device, based on the collected context information.

For example, according to a second embodiment, in a case in which an event (e.g., Bluetooth connection of a vehicle (e.g., the second electronic device)) occurs during driving, the first electronic device (e.g., the electronic device 101) may turn on voice call of the first electronic device and execute navigation. The first electronic device may reproduce music through the second electronic device (e.g., a vehicle) connected thereto through Bluetooth. The first electronic device may control the third electronic device (e.g., the wrist wearable device 301 in FIG. 3) operatively connected thereto to change the third electronic device into a driving mode. According to an embodiment, the first electronic device may change configuration information of the first electronic device to increase sensitivity of a microphone. The first electronic device may change configuration information of the second electronic device to increase sensitivity of a microphone of the second electronic device.

For example, according to a third embodiment, the first electronic device (e.g., the electronic device 101) may identify whether a user is positioned at office during working hours (e.g., 9:30 to 18:00) and in a case in which the condition is satisfied, the first electronic device may be changed into a vibration mode. The first electronic device may be connected to company Wi-Fi and changed into a working mode. According to an embodiment, the first electronic device may change configuration information of the first electronic device to increase sensitivity of a microphone.

For example, according to a fourth embodiment, the first electronic device (e.g., the electronic device 101) may identify whether a user is positioned in a room playing a game at night (e.g., 23 o'clock) and in a case in which the condition is satisfied, the first electronic device may be changed into a landscape mode. The first electronic device may be connected to home Wi-Fi and block notifications. For example, in a state in which the first electronic device is operatively connected to the third electronic device (e.g., glasses), the first electronic device may control the third electronic device so that the third electronic device plays (reproduces) a game screen. According to an embodiment, the first electronic device may turn off a microphone and may not receive an ambient audio signal. The first electronic device may change configuration information of the second electronic device (e.g., the ear wearable device) to increase microphone sensitivity of the second electronic device and control to receive an ambient audio signal. The first electronic device may change configuration information of the third electronic device to increase microphone sensitivity of the third electronic device and control to receive an ambient audio signal.

FIG. 9B is a table illustrating an embodiment in which an operation mode of an electronic device and at least one external electronic device is changed based on collected context information according to various embodiments of the disclosure.

Referring to FIG. 9B, embodiments corresponding to the first embodiment to the fourth embodiment of FIG. 9A are described. According to an embodiment, the first electronic device (e.g., the electronic device 101) may change sound recognition configuration of the first electronic device, the second electronic device, and/or the third electronic device, based on the collected context information.

For example, the first embodiment may correspond to a situation in which a user is listening to music while going to work by public transportation. Since the user is listening to music, it is necessary to listen more carefully to a warning sound (e.g., a vehicle horn sound, a siren sound, a police car signal sound, an ambulance signal sound, and a fire engine signal sound) to indicate an emergency situation. According to the first embodiment, the first electronic device may load a danger warning sound model and identify whether audio information corresponding to the danger warning sound model is included in an ambient audio signal. The first electronic device may intensively detect the audio information corresponding to the danger warning sound model.

For example, the second embodiment may correspond to a situation in which a user is listening to music while driving after executing navigation. It is necessary for the user to receive a guide voice of navigation while listening to music. According to the first embodiment, the first electronic device may load a speech detection sound model and identify whether audio information corresponding to the speech detection sound model is included in an ambient audio signal. The first electronic device may intensively detect the audio information corresponding to the speech detection sound model.

For example, the third embodiment may correspond to a situation in which the user is in a meeting at the company. The user needs to listen to a voice of a counterpart during a meeting. According to the third embodiment, the first electronic device may load a voice detection sound model and identify whether audio information corresponding to the voice detection sound model is included in an ambient audio signal. The first electronic device may intensively detect the audio information corresponding to the voice detection sound model.

For example, the fourth embodiment may correspond to a situation in which the user plays a game while wearing an ear wearable device and glasses. The user needs to listen to a voice calling the user during the game. According to the fourth embodiment, the first electronic device may load a speech detection sound model and identify whether audio information corresponding to the speech detection sound model is included in an ambient audio signal. The first electronic device may intensively detect the audio information corresponding to the speech detection sound model.

According to various embodiments, the electronic device 101 may configure a sound model, based on voice-related information and keyword-related information.

Figure 10A:
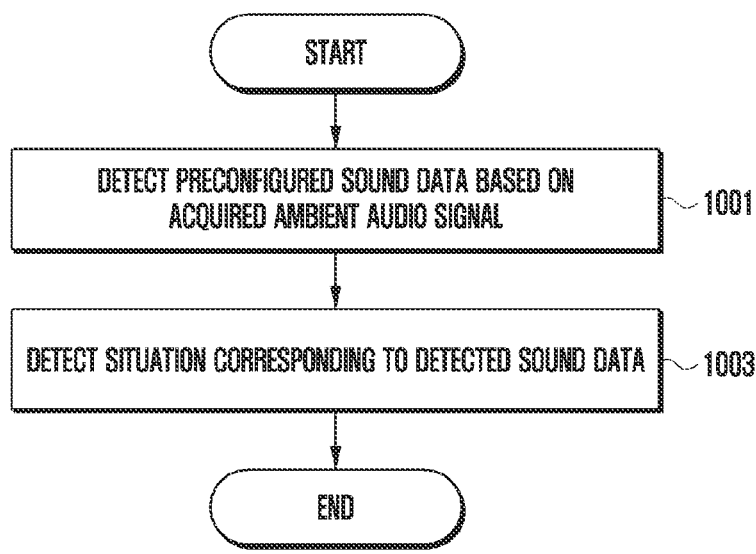
FIG. 10A is a flowchart illustrating an example method in which an example electronic device detects an ambient situation based on a received ambient audio signal, according to various embodiments.

FIG. 10A is a flowchart illustrating an example method in which an example electronic device detects an ambient situation based on a received ambient audio signal according to various embodiments.

In operation 1001, a processor (e.g., the processor 120 in FIG. 1) of an electronic device (e.g., the electronic device 101 in FIG. 1) may detect preconfigured sound data based on an acquired ambient audio signal. For example, the electronic device 101 may configure at least one keyword information and audio-related information (e.g., audio frequency information and audio volume size information) as sound data. According to an embodiment, the electronic device 101 may identify whether preconfigured audio data is included in the acquired ambient audio signal.

In operation 1003, the electronic device 101 may detect a situation corresponding to the detected sound data. For example, in a case in which the detected sound data corresponds to a vehicle horn sound, the electronic device may detect a situation in which a user needs to pay attention to a vehicle on the road. In a case in which the detected sound data corresponds to an ambulance signal sound, the electronic device may detect a situation in which a user needs to yield to an ambulance.

According to an embodiment, the electronic device 101 may configure multiple sound models corresponding to various situations and detect a specific situation corresponding to the sound models based on the acquired audio signal.

Figure 10B:
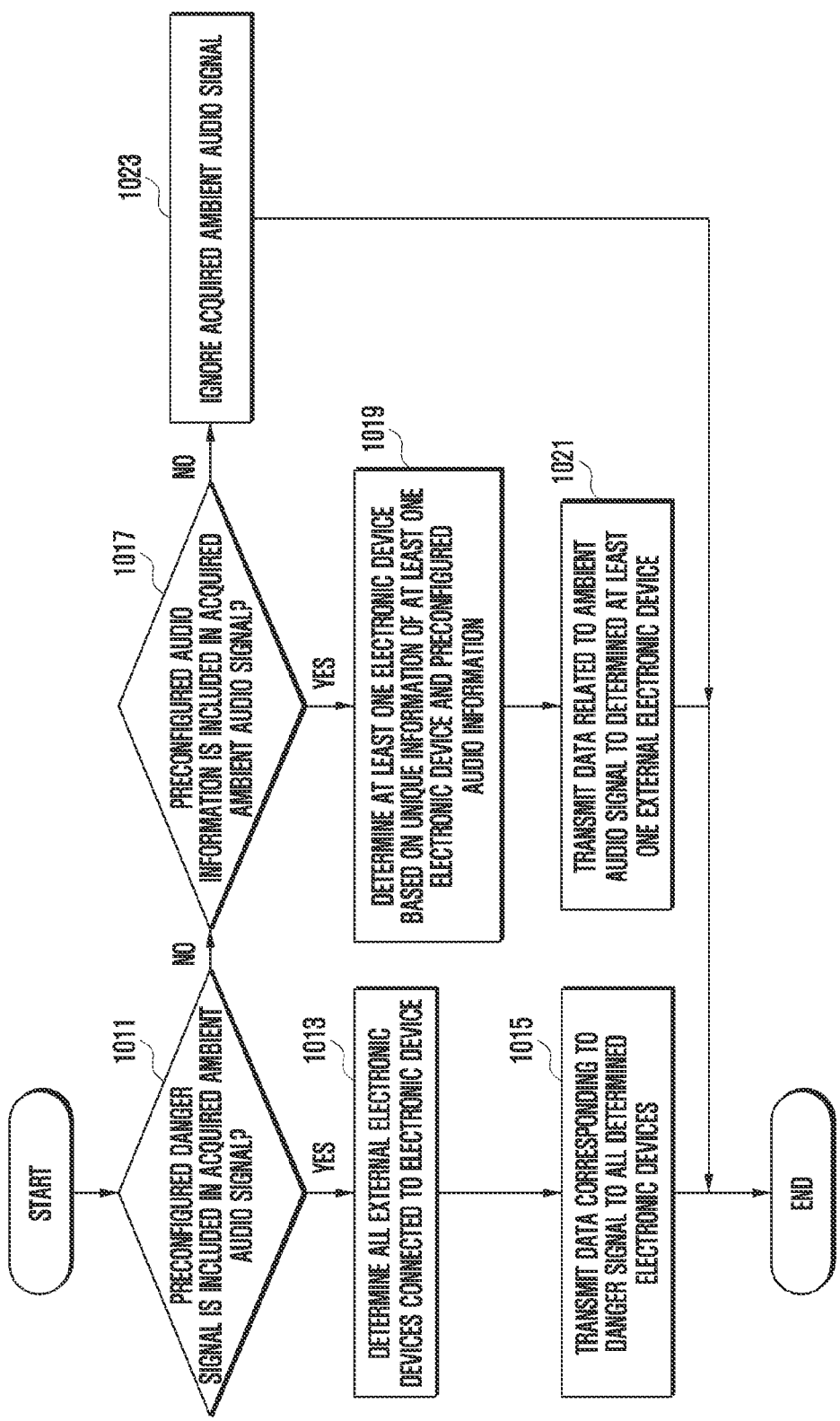
FIG. 10B is a flowchart more specifically illustrating an example method in which an example electronic device detects an ambient situation based on a received ambient audio signal, according to various embodiments.

FIG. 10B is a flowchart more specifically illustrating an example method in which an example electronic device detects an ambient situation based on a received ambient audio signal according to various embodiments.

In operation 1011, the processor 120 of the electronic device 101 may determine whether a preconfigured danger signal is included in the acquired ambient audio signal. In a case in which a danger signal is included, in operation 1013, the processor 120 may determine all external electronic devices operatively connected to the electronic device 101, and in operation 1015, may transmit data corresponding to the danger signal to the all determined external electronic devices. According to an embodiment, the electronic device 101 may transmit an original sound corresponding to the danger signal or transmit a preconfigured warning sound corresponding to the danger signal.

In a case in which a danger signal is not included in the ambient audio signal acquired in operation 1011, in operation 1017, the processor 120 may determine whether preconfigured audio information is included. In a case in which preconfigured audio information is included, in operation 1019, the processor 120 may determine at least one external electronic device, based on at least one piece of unique information of the electronic device and preconfigured audio information. For example, the preconfigured audio information may include a specific name, and at least one external electronic device corresponding to the specific name may be determined. In operation 1021, the processor 120 may transmit data related to the ambient audio signal to the determined at least one external electronic device.

In a case in which the preconfigured audio information is not included in the ambient audio signal acquired in operation 1017, in operation 1023, the processor 120 may ignore the acquired ambient audio signal.

According to various embodiments, the electronic device 101 may analyze an ambient audio signal acquired through the electronic device 101 and/or an external electronic device and determine at least one external electronic device according to an analysis result. The electronic device 101 may transmit data related to the ambient audio signal to the determined at least one external electronic device.

FIG. 11 is a table illustrating an example embodiment in which, based on a received ambient audio signal, an electronic device ignores the ambient audio signal, according to various embodiments.

Referring to FIG. 11, embodiments corresponding to the first embodiment to the fourth embodiment of FIG. 9A and FIG. 9B are described. According to an embodiment, a first electronic device (e.g., the electronic device 101) may selectively perform analysis with respect to an ambient audio signal based on a determined sound model.

For example, according to the first embodiment, the first electronic device may configure the priority of a danger sound (e.g., a vehicle horn sound, a siren sound, a police car signal sound, an ambulance signal sound, and a fire engine signal sound) to be high and configure the priority of other sounds to be low or ignore same.

For example, according to the second embodiment to the fourth embodiment, the first electronic device may configure the priority of a human voice to be high and the priority of an ambient music sound to be low based on the speech detection sound model.

According to various embodiments, the electronic device 101 may configure at least one sound model according to convenience of a user and selectively analyze an ambient audio signal based on the configured sound model.

Figure 12:
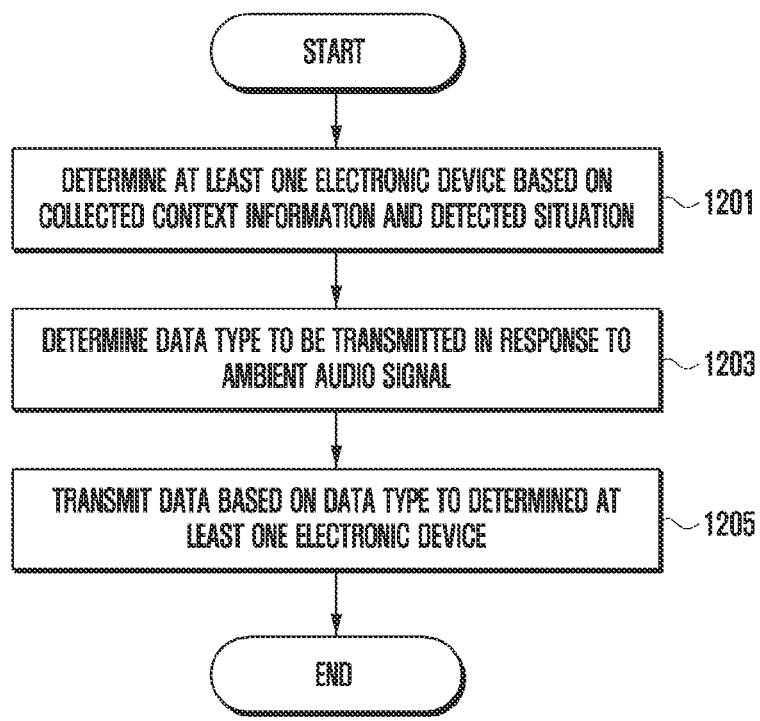
FIG. 12 is a flowchart illustrating an example method in which an example electronic device determines at least one external electronic device to transmit an analysis-completed ambient audio signal, according to various embodiments.

FIG. 12 is a flowchart illustrating an example method in which an example electronic device determines at least one external electronic device to which to transmit an analysis-completed ambient audio signal, according to various embodiments.

In operation 1201, a processor (e.g., the processor 120 in FIG. 1) of an electronic device (e.g., the electronic device 101 in FIG. 1) may determine at least one external electronic device based on collected context information and a detected situation. For example, the electronic device 101 may determine at least one external electronic device capable of receiving data related to an ambient audio signal from among operatively connected at least one external electronic device.

In operation 1203, the electronic device 101 may determine a data type to be transmitted in response to the ambient audio signal. For example, the data type may include at least one of an original sound of the ambient audio signal, a notification sound corresponding to the ambient audio signal, a preconfigured notification message, or preconfigured notification information.

In operation 1205, the electronic device 101 may transmit data based on the determined data type to the determined at least one external electronic device. According to an embodiment, the electronic device 101 may determine a data type appropriate to be provided to a user by the at least one external electronic device, based on collected context information and a detected situation. The electronic device 101 may transmit data corresponding to the determined data type to the at least one external electronic device. According to an embodiment, the electronic device 101 may determine a data type which may be identified by a user based on the collected context information and the detected situation and provide data corresponding to the determined data type to the user.

FIG. 13 is a table illustrating an example embodiment in which an example electronic device determines at least one external electronic device to which to transmit an analysis-completed ambient audio signal, according to various embodiments.

Referring to FIG. 13, embodiments corresponding to the first embodiment to the fourth embodiments of FIG. 9A and FIG. 9B are described.

For example, according to the first embodiment, the first electronic device may determine an original sound of the ambient audio signal as the data type to be transmitted and transmit the determined original sound to all external electronic devices (e.g., electronic devices capable of outputting the original sound) capable of communication with the first electronic device. The first electronic device may transmit a command together for changing a mode of the external electronic device so that the electronic device may output the original sound.

For example, according to the second embodiment, the first electronic device may determine an original sound of the ambient audio signal as the data type to be transmitted and the determined original sound may be transmitted to the first electronic device operating navigation.

For example, according to the third embodiment, the first electronic device may determine an original sound of the ambient audio signal as the data type to be transmitted and transmit the determined original sound to an external electronic device directly connected to the first electronic device.

For example, according to the fourth embodiment, the first electronic device may determine an original sound of the ambient audio signal as the data type to be transmitted and transmit the determined original sound to a second electronic device specified in speech (e.g., corresponding to audio information included in the ambient audio signal).

A method according to various embodiments may include acquiring an ambient audio signal based on at least one of an electronic device or at least one external electronic device connected to the electronic device to perform communication therewith, identifying whether preconfigured audio information is included based on the acquired ambient audio signal, determining the at least one external electronic device in response to the identifying of the audio information, and transmitting data related to the ambient audio signal to the determined at least one external electronic device.

The acquiring of the ambient audio signal may include acquiring context information of the electronic device through at least one of the electronic device or the at least one external electronic device, determining at least one microphone device to acquire the ambient audio signal based on the acquired context information, and acquiring the ambient audio signal through the determined at least one microphone device.

In a method according to an embodiment, the context information may include at least one of information related a state of the electronic device, user activity information, user schedule information, time information, location information, or event information.

A method according to an embodiment may further include changing configuration information of the at least one microphone device to allow the at least one microphone device to acquire the ambient audio signal.

A method according to an embodiment may further include increasing sensitivity of the microphone based on the acquired context information in a case in which the ambient audio signal needs to be accurately acquired (e.g., be acquired with an accuracy greater than a defined accuracy), and decreasing sensitivity of the microphone based on the acquired context information in a case in which the ambient audio signal does not need to be accurately acquired (e.g., be acquired with an accuracy less than a defined accuracy).

The determining of the at least one external electronic device according to an embodiment may include acquiring at least one of range information or angle information of the at least one external electronic device using an ultra-wide-band (UWB) signal and determining the at least one external electronic device based on at least one of the acquired range information or angle information.

In a method according to an embodiment, the preconfigured audio information may include at least one of a vehicle horn sound, navigation voice information, AI speaker voice information, a siren sound, a police car signal sound, an ambulance signal sound, or a fire engine signal sound, and the data related to the ambient audio signal may include at least one of an original sound of the ambient audio signal, a notification sound corresponding to the ambient audio signal, a preconfigured notification message, or preconfigured notification information.

The transmitting of the data related to the ambient audio signal may include identifying an emergency situation, based on the audio information included in the ambient audio signal and transmitting the data related to the ambient audio signal to all external electronic devices connected to the electronic device based on the emergency situation being identified.

A method according to an embodiment may further include determining at least one external electronic device corresponding to the audio information based on no emergency situation being identified and transmitting the data related to the ambient audio signal to the determined at least one external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium which is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a wireless communication circuit;
memory; and
at least one processor, comprising processing circuitry, operatively connected to the wireless communication circuit, and the memory, and
configured, individually or collectively, to:
acquire, from an external electronic device connected to the electronic device through the wireless communication circuit, context information comprising information indicating a state of the external electronic device,
determine whether to activate a microphone of the electronic device or a microphone of the external electronic device based on the context information,
activate one of the microphone of the electronic device or the microphone of the external electronic device based on the determination,
acquire an ambient audio signal using the activated microphone,
identify whether preconfigured audio information is included in the acquired ambient audio signal; and
transmit, in response to identifying that the preconfigured audio information is included in the acquired ambient audio signal, data related to the ambient audio signal to the external electronic device.

2. The electronic device of claim 1, further comprising a plurality of sensors,
wherein the
context information further comprises information based on the plurality of sensors.

3. The electronic device of claim 1,
wherein the context information comprises at least one of information related to a state of the electronic device, user activity information, user schedule information, time information, location information, or event information.

4. The electronic device of claim 1, wherein at least one processor is configured individually or collectively to change configuration information of the activated microphone to allow the activated microphone to acquire the ambient audio signal.

5. The electronic device of claim 4, wherein at least one processor is configured individually or collectively to:
increase sensitivity of the activated microphone based on the acquired context information to acquire the ambient audio signal with an accuracy greater than a first defined accuracy; and
decrease sensitivity of the activated microphone based on the acquired context information to acquire the ambient audio signal with an accuracy less than a second defined accuracy.

6. The electronic device of claim 1, wherein at least one processor is configured individually or collectively to:
acquire at least one of range information or angle information of the external electronic device using an ultra-wideband (UWB) signal; and
determine the external electronic device based on at least one of the acquired range information or angle information.

7. The electronic device of claim 1, wherein external electronic device comprises an ear wearable device mountable on a user's ear or a wearable device wearable at least partially on a user's body.

8. The electronic device of claim 1,
wherein the preconfigured audio information comprises at least one of a vehicle horn sound, navigation voice information, AI speaker voice information, a siren sound, a police car signal sound, an ambulance signal sound, or a fire engine signal sound.

9. The electronic device of claim 1, wherein at least one processor is configured individually or collectively to:
identify an emergency, based on the preconfigured audio information included in the ambient audio signal; and
transmit the data related to the ambient audio signal to all external electronic devices connected to the electronic device, based on an emergency being identified.

10. The electronic device of claim 9, wherein at least one processor is configured individually or collectively to:
determine at least one external electronic device corresponding to the preconfigured audio information, based on no emergency being identified; and transmit data related to the ambient audio signal to the determined at least one external electronic device.

11. The electronic device of claim 1, wherein the data related to the ambient audio signal comprises at least one of an original sound of the ambient audio signal, a notification sound corresponding to the ambient audio signal, a preconfigured notification message, or preconfigured notification information.

12. A method for an electronic device, the method comprising:
acquiring context information from an external electronic device connected to the electronic device, the context information comprising information indicating a state of the external electronic device;
determining whether to activate a microphone of the electronic device or a microphone of the external electronic device based on the context information;
activating one of the microphone of the electronic device or the microphone of the external electronic device based on the determination;
acquiring an ambient audio signal using the activated microphone;
identifying whether preconfigured audio information is included in the acquired ambient audio signal; and
transmitting, in response to identifying that the preconfigured audio information is included in the acquired ambient audio signal, data related to the ambient audio signal to the external electronic device.

13. The method of claim 12, wherein the
context information further comprises information acquired by a plurality of sensors of the electronic device.

14. The method of claim 12,
wherein the context information comprises at least one of information related to a state of the electronic device, user activity information, user schedule information, time information, location information, or event information.

15. The method of claim 12, further comprising changing configuration information of the activated microphone to allow the activated microphone device to acquire the ambient audio signal.

16. The method of claim 15, further comprising:
increasing sensitivity of the activated microphone based on the acquired context information to acquire the ambient audio signal with an accuracy greater than a first defined accuracy; and
decreasing sensitivity of the activated microphone based on the acquired context information to acquire the ambient audio signal with an accuracy less than a second defined accuracy.

17. The method of claim 12, further comprising:
acquiring at least one of range information or angle information of at least one external electronic device using an ultra-wideband (UWB) signal; and
determining, as the external electronic device, one of the at least one external electronic device based on at least one of the acquired range information or angle information.

18. The method of claim 12,
wherein the preconfigured audio information comprises at least one of a vehicle horn sound, navigation voice information, AI speaker voice information, a siren sound, a police car signal sound, an ambulance signal sound, or a fire engine signal sound, and
wherein the data related to the ambient audio signal comprises at least one of an original sound of the ambient audio signal, a notification sound corresponding to the ambient audio signal, a preconfigured notification message, or preconfigured notification information.

19. The method of claim 12, wherein the transmitting of the data related to the ambient audio signal comprises:
identifying an emergency, based on the preconfigured audio information included in the ambient audio signal; and
transmitting the data related to the ambient audio signal to all external electronic devices connected to the electronic device based on the emergency being identified.

20. The method of claim 19, further comprising:
determining at least one external electronic device corresponding to the preconfigured audio information based on no emergency being identified; and
transmitting the data related to the ambient audio signal to the determined at least one external electronic device.

* * * * *